(12) United States Patent
Graham et al.

(10) Patent No.: US 7,674,345 B2
(45) Date of Patent: Mar. 9, 2010

(54) ADHESIVE ARTICLES WITH DISCONTINUITIES AND METHODS OF MAKING THE SAME

(75) Inventors: Paul D. Graham, Woodbury, MN (US); Jason D. Romsos, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 754 days.

(21) Appl. No.: 11/608,321

(22) Filed: Dec. 8, 2006

(65) Prior Publication Data
US 2008/0138591 A1   Jun. 12, 2008

(51) Int. Cl.
B32B 38/04 (2006.01)
B32B 29/00 (2006.01)
B32B 3/10 (2006.01)

(52) U.S. Cl. .......... 156/252; 156/250; 156/256; 156/289; 156/290; 428/41.7; 428/42.1; 428/42.3; 428/43; 428/195.1; 428/211.1; 428/914; 428/915

(58) Field of Classification Search .......... 156/250, 156/252, 256, 289, 290; 428/41.8, 42.1, 428/42.3, 43, 131–136, 195.1, 201, 211.1, 428/914, 915
See application file for complete search history.

(56) References Cited

U.S. PATENT DOCUMENTS

| 2,552,664 | A | * | 5/1951 | Burdine ............ 428/136 |
| 3,691,140 | A | | 9/1972 | Silver |
| 3,857,731 | A | | 12/1974 | Merrill, Jr. et al. |
| 4,166,152 | A | | 8/1979 | Baker et al. |
| 4,495,318 | A | | 1/1985 | Howard |
| 4,522,672 | A | | 6/1985 | Brister et al. |
| 4,977,006 | A | | 12/1990 | Smith et al. |
| 5,011,559 | A | | 4/1991 | Felix |
| 5,045,569 | A | | 9/1991 | Delgado |
| 5,073,457 | A | | 12/1991 | Blackwell |
| 5,167,743 | A | | 12/1992 | Chalfin |
| 5,299,833 | A | * | 4/1994 | Madole, Jr. ........... 281/2 |
| 5,340,427 | A | | 8/1994 | Cusack et al. |
| 5,458,938 | A | * | 10/1995 | Nygard et al. ........ 428/40.2 |
| 5,571,617 | A | | 11/1996 | Cooprider et al. |
| 5,639,332 | A | | 6/1997 | Instance |
| 5,663,241 | A | | 9/1997 | Takamatsu et al. |
| 5,695,587 | A | | 12/1997 | Dumoux |

(Continued)

FOREIGN PATENT DOCUMENTS

GB    2 263 252    7/1993

(Continued)

Primary Examiner—Mark A Osele
Assistant Examiner—Christopher C Caillouet
(74) Attorney, Agent, or Firm—Yen T. Florczak (57) ABSTRACT

A method of introducing discontinuities to an adhesive coated region of a substrate is provided. The method includes the steps of (a) providing a web having upper and lower edges; (b) excising a portion of the web creating open sections interposed between retained sections connected to carrier sections, each including the upper or lower edge of the web to yield a patterned web; (c) perforating the patterned web such that the perforations span from one open section to the next open section to yield a perforated web; (d) contacting the perforated web to the adhesive coated region of the substrate; and (e) removing the carrier sections at the perforations leaving the retained sections on the substrate.

11 Claims, 5 Drawing Sheets

U.S. PATENT DOCUMENTS

| | | |
|---|---|---|
| 5,714,327 A | 2/1998 | Houthoff et al. |
| 5,756,625 A | 5/1998 | Crandall et al. |
| 5,824,748 A | 10/1998 | Kesti et al. |
| 5,877,252 A | 3/1999 | Tsujimoto et al. |
| 6,132,831 A | 10/2000 | Thomas-Cote |
| 6,149,614 A | 11/2000 | Dunshee et al. |
| RE37,563 E | 2/2002 | Cooprider et al. |
| 6,451,149 B1 | 9/2002 | McKenney et al. |
| 6,649,011 B1 | 11/2003 | Hardt et al. |
| 2004/0211510 A1 | 10/2004 | Franko, Sr. |
| 2006/0037693 A1 | 2/2006 | Wade |
| 2006/0188710 A1 | 8/2006 | Windorski et al. |
| 2006/0210792 A1 | 9/2006 | Windorski et al. |
| 2007/0248815 A1* | 10/2007 | Windorski et al. .......... 428/343 |

FOREIGN PATENT DOCUMENTS

| | | |
|---|---|---|
| JP | 2004-34304 | 2/2004 |
| WO | WO 03/043890 | 5/2003 |
| WO | WO 2005/077672 | 8/2005 |

* cited by examiner

ADHESIVE ARTICLES WITH DISCONTINUITIES AND METHODS OF MAKING THE SAME

FIELD OF INVENTION

The present invention provides a method of adding non-adhesive discontinuities to a substrate having an adhesive region. In particular, the discontinuities causes the adhesive to be recessed thereby yielding an article having a securing mechanism that exhibits adhesion on demand, i.e., the article exhibits adhesive properties when a consumer applies a pressure activating the securing mechanism to attach the article to an intended surface.

BACKGROUND

There are various methods to introduce non-adhesive discontinuities to an adhesive backed substrate. For example, U.S. Pat. No. 6,451,149 describes a method where in one step, die cut pieces are produced on a carrier web and in another step, a peeler bar and an moving label applicator are used to transfer the die cut pieces from the carrier web to articles or products. In this particular method, the die cut pieces are generally secured to the carrier web using a pressure sensitive adhesive. Thus, the carrier web is a release liner in order for the die cut pieces to transfer from the carrier web to the second web.

In another method, a first web and a second adhesive-coated web are laminated. A controlled depth cut (commonly referred to as a "kiss cut") is made on the first web to create non-adhesive discontinuities. Thereafter, a continuous portion (i.e., the weed) of the first web is separated thereby leaving the non-adhesive discontinuities laminated to the second web.

While these methods have been available, other methods are being sought.

SUMMARY

The present invention provides a streamlined process for introducing non-adhesive discontinuities into an adhesive backed web, thereby creating a recessed adhesive article. The inventive method and resulting articles do not rely on the use of a release liner, which increases the cost of a product. Because a wide variety of materials can be used and the equipment used does not rely on reciprocating parts, the present method facilitates high speed processing, on the order of hundreds of feet per minute for a line speed.

In one aspect, the present invention pertains to a method of adding discontinuities to an adhesive coated region of a substrate comprising the steps of (a) providing a web having upper and lower edges; (b) excising a portion of the web creating open sections interposed with retained sections connected to carrier sections, each including the upper or lower edge of the web to yield a patterned web; (c) perforating the patterned web such that the perforations span from one open section to the next open section to yield a perforated web; (d) contacting the perforated web to the adhesive coated region of the substrate; and (e) removing the carrier sections at the perforations leaving the retained sections on the substrate. Typically, the patterned web has a repeating pattern; although it does not need to be. Typically and as further described below with reference to the drawings, the retained sections are disposed between the perforations and the carrier sections are disposed between an edge of the web and the perforations.

While in some embodiments, each retained section can be discrete; each carrier section is continuous to facilitate its removal.

In another aspect, the present invention pertains to an article comprising (a) a substrate having a repositionable pressure sensitive adhesive region defined by upper and lower edges; and (b) a plurality of non-adhesive sections disposed on a portion of the adhesive region such that open sections of exposed adhesive are interposed between the non-adhesive sections, a portion of which spans substantially continuously from the upper to the lower edge of the adhesive region. In one embodiment, the non-adhesive sections are discrete.

In yet another aspect, the present invention pertains to an easel pad comprising (a) a plurality of sheets stacked on top of one another each having writable opposing first and second surfaces, and upper and lower edges; and (b) a securing mechanism disposed on the second surface of the sheet, the mechanism comprising (i) a repositionable pressure sensitive adhesive having upper and lower edges and disposed proximate to the upper edge of the sheet; and (ii) plurality of non-adhesive sections disposed on the adhesive creating open sections of exposed adhesive interposed between the non-adhesive sections, a portion of which spans substantially continuously from the upper to the lower edge of the adhesive. In one embodiment, the non-adhesive sections are discrete. As used herein, the term "discrete" as used to describe the retained section or the non-adhesive section generally means such sections are individually distinct or unconnected to another section. Thus, the discrete sections can also be described as islands of retained sections or non-adhesive sections.

In this document, the term "about" is presumed to modify all numerical dimensions.

BRIEF DESCRIPTION OF THE DRAWINGS

The invention can be better described with reference to the drawings, wherein.

These figures are idealized, are not drawn to scale, and are intended merely for illustrative purposes.

DETAILED DESCRIPTION

Figure 1:
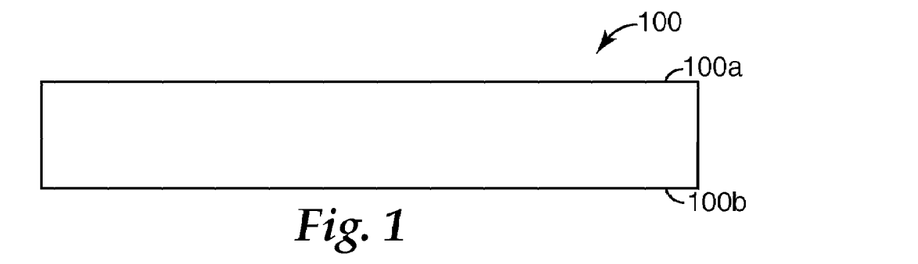
FIG. 1 is a top plan view of an exemplary web that may be used according to one method of the present invention.

FIG. 1 shows an exemplary substantially rectangular shaped web having substantially parallel top and bottom edges, 100a and 100b that can be used in the present invention. Other starting web configurations can be used. The web can be made from paper or polymeric films. Suitable polymeric films include, but not limited to, polyethylene terephthalate, polypropylene, and polyethylene, and copolymers thereof. In one embodiment, the thickness of the web is less than about 0.2 mm. The web can be light transmissive, meaning that it will allow at least a portion of incident light through, or it can be opaque. Furthermore, the web can be colored. The web material should be able to adhere to the adhesive used on the substrate.

Figure 2:
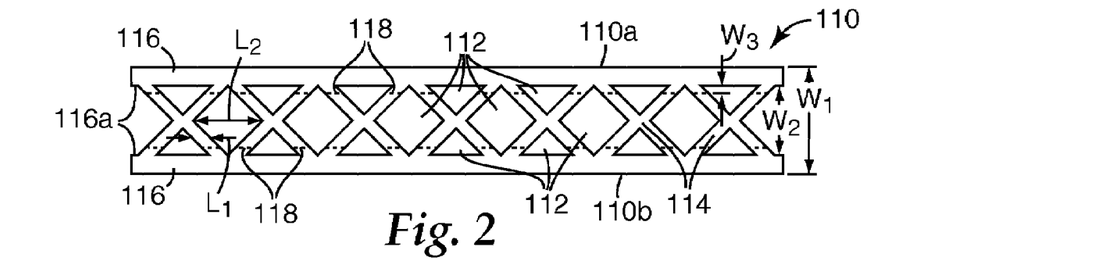
FIG. 2 is a top plan view of the embodiment of FIG. 1 after the web has been processed to yield a patterned web.

FIG. 2 shows a top plan view of the web of FIG. 1 after a portion of the web has been excised and perforated. A perforated web 110 has an overall length L and an overall width W. The web includes a plurality of open sections or cutouts 112 interposed between a plurality of retained sections 114 connected to carrier sections 116. The carrier sections of the perforated web include substantially parallel top and bottom edges 110a and 110b that correspond to the top and bottom edges of the predecessor web 100 of FIG. 1, namely edges 100a and 100b. In this particular embodiment, the perforated web 110 has an upper carrier section that includes the top edge 110a to the perforation 118 lying closest to the top edge and the lower carrier section that includes the bottom edge 110b to the perforation 118 lying closest to the bottom edge. The retained sections have substantially the same geometry, each in the form of substantially an "X". While FIG. 2 shows perforations 118 disposed on the retained sections, they can also be disposed between the carrier section and the retained section, or on the carrier section. The perforations span from one open section to the next adjacent open section. The perforations typically include slits on the web lying between ties. The perforation design should be selected so that the separation of the carrier section does not dislodge the retained sections from the adhesive.

In one embodiment, the perforated web based on the design of FIG. 2 has a first width, $W_1$, of about 4 inch (10.2 cm), a second width, $W_2$, of about 2.5 inch (6.4 cm), and a third width, $W_3$, of about 0.2 inch (5 mm). The third width denotes the distance from an inner surface of the carrier, 116a, to the perforation. The web 110 also has a length $L_1$ of about 2.5 inch and a length $L_2$, which denotes one dimension of the retained section, of about 0.27 inch (6.9 mm). In this particular embodiment, the perforation includes two ties, each of 0.010 inch (0.25 mm) in length disposed between three slits. The three slits consist of a long slit, a short slit, and a long slit, with the long slit being 0.078 inch (2.0 mm) in length and the short slit being 0.0321 inch (0.82 mm) in length. Thus, from one open section to the next, the perforation on the retained section can be described as a long slit, a tie, a short slit, a tie, and a long slit. While the foregoing description of the perforation of FIG. 2 is useful, other designs can be used. For example, another perforation design includes a short slit, a tie, a long slit, a tie, and a short slit. Furthermore, three or more ties can be used along with long and or short slits therebetween.

Figure 3:
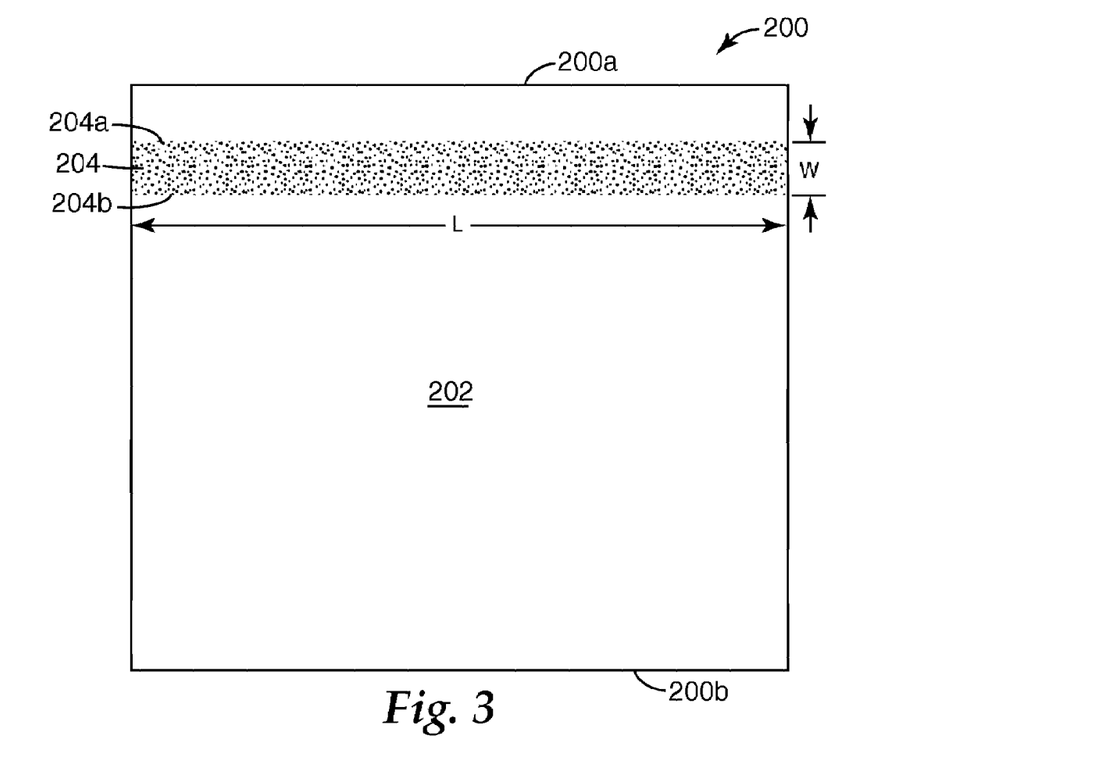
FIG. 3 is a bottom plan view of an exemplary an adhesive coated substrate that may be used according to one method of the present invention.

FIG. 3 shows a bottom plan view of an exemplary substantially rectangular shaped substrate having opposing first (not shown) and second 202 surfaces and top and bottom edges, 200a and 200b. Adhesive 204 is disposed on the second surface proximate to the top edge. In this particular embodiment, the adhesive is in generally in the form of a stripe having substantially parallel upper and lower edges, 204a and 204b respectively. In one exemplary embodiment, the substrate is a sheet of easel paper. In some embodiments, the width of the adhesive stripe varies from 7.6 to 0.32 cm. In other embodiments, the width of the adhesive stripe varies from 7.6 to 2.5 cm. In one embodiment, the thickness of the substrate is less than about 0.5 mm.

Any type of adhesive can be used for the substrate and the adhesive can cover any portion of the substrate. In one embodiment, the adhesive is a microsphere-based repositionable pressure sensitive adhesive. The repositionable adhesive can be solvent based, water based, or can be a solventless, hot melt adhesive. Suitable repositionable adhesives includes those disclosed in the following U.S. Pat. No. 3,691,140 (Silver); U.S. Pat. No. 3,857,731 (Merrill et al.); U.S. Pat. No. 4,166,152 (Baker et al.); U.S. Pat. No. 4,495,318 (Howard); U.S. Pat. No. 5,045,569 (Delgado); U.S. Pat. No. 5,073,457 (Blackwell); U.S. Pat. No. 5,571,617 (Cooprider et al.); U.S. Pat. No. 5,663,241 (Takamatsu et al.); U.S. Pat. No. 5,714,327 (Cooprider et al.); U.S. Pat. RE No. 37,563 (Cooprider et al.); U.S. Pat. No. 5,756,625 (Crandall et al.); U.S. Pat. No. 5,824,748 (Kesti et al.); and U.S. Pat. No. 5,877,252 (Tsujimoto et al.). In another embodiment, the repositionable pressure sensitive adhesive is polyacrylate-based microsphere adhesive.

Figure 4:
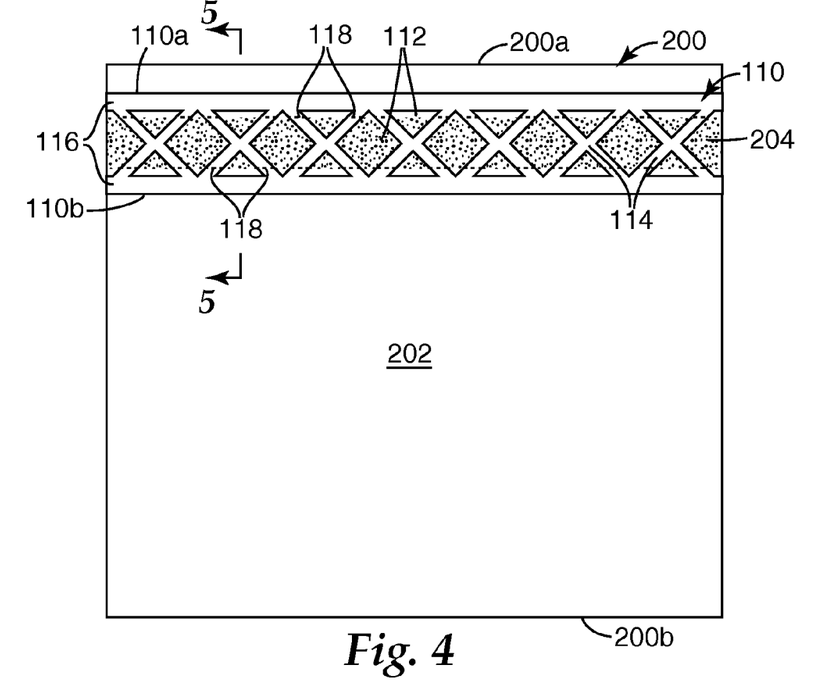
FIG. 4 is a bottom plan view of the substrate of FIG. 3 with the patterned and perforated web of FIG. 2 attached.

FIG. 4 shows a bottom plan view of the substrate of FIG. 3 with the perforated web 110 of FIG. 2 disposed on the adhesive region of the substrate. In one exemplary method, the web 110 is aligned with the adhesive 204 of the substrate such that the perforations 118 on the perforated web substantially coincides with at least one of the upper and lower edges of the adhesive.

Figure 4A:
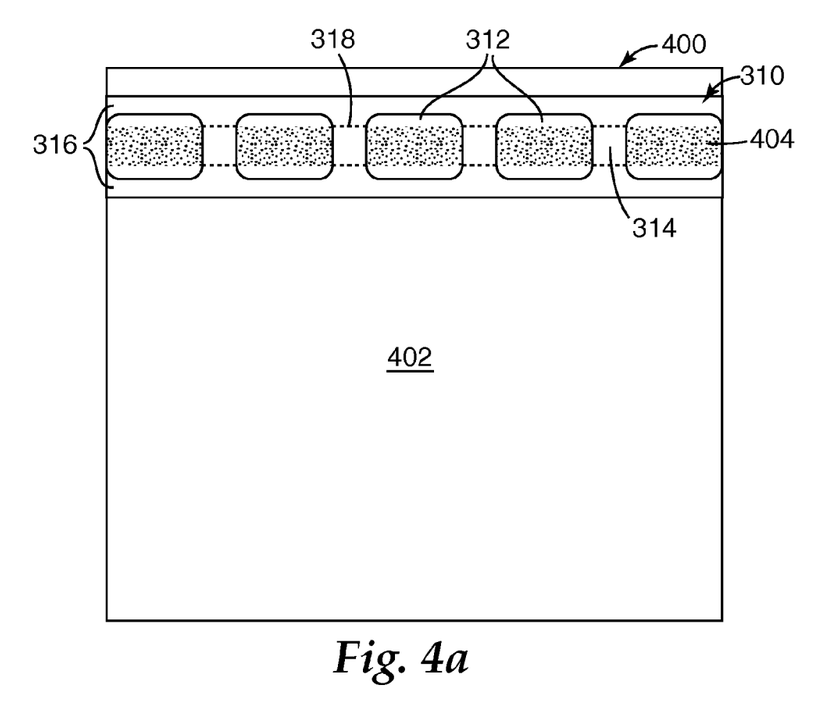
FIG. 4a is a bottom plan view of another exemplary patterned and perforated web disposed on another exemplary substrate.

FIG. 4a shows a bottom plan view of a substrate 400, similar that of substrate 200 of FIG. 3, laminated to a perforated web 310. The substrate has a stripe of adhesive 404 on its second side 402. The web includes a plurality of open sections or cutouts 312 interposed between a plurality of retained sections 314 connected to upper and lower carrier sections 316. The retained sections have substantially the same geometry, each in the form of substantially a rectangle. Perforations 318 are disposed between the carrier section, the retained sections. The perforations span from one open section to the next adjacent open section and align with the top and bottom edges of the adhesive stripe of the substrate. Specifically, the patterned and perforated web of this figure includes substantially rectangular open sections, each having dimensions of 2.5 by 2.0 inch (6.4 by 5.1 cm). The distance between one open section to the next adjacent open section is 0.25 inch (6.4 mm). The corners of the open section are rounded to a 0.25 inch radius. And, the distance between a top and a bottom perforation is about 2.1 inch (5.3 cm). The design of the perforations is very similar to that described in FIG. 2. Thus, a wide variety of designs can be used for the perforated web.

Figure 5:
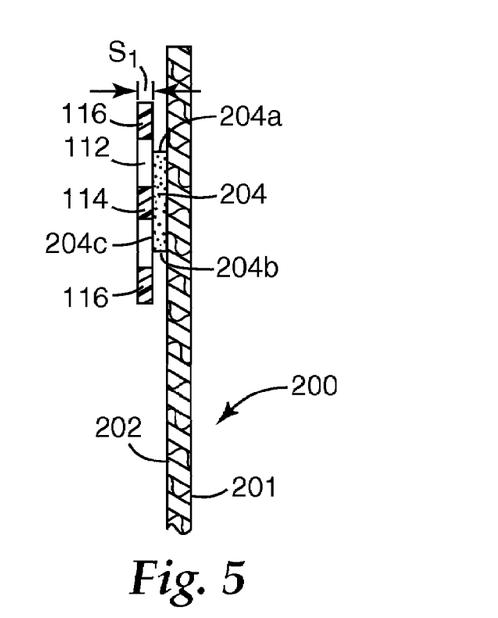
FIG. 5 is a cross-sectional view of the embodiment of FIG. 4 taken along line 5-5.

FIG. 5 shows a cross-sectional view of the embodiment of FIG. 4 taken along line 5-5 showing substrate 200 having opposing first and second surfaces, 201 and 202. Disposed on the second surface of the substrate is adhesive 204 having top and bottom edges 204a and 204b. The patterned and perforated web includes retained section 114 attached to carrier section 116. Interposed between the retained sections are open sections 112. This cross-sectional view better shows that the retained portion 114 has a certain thickness, denoted as $S_1$, which function to space or separate an exposed surface 204c of adhesive 204 from contacting an adjacent surface. Thus sheet 200 can be handled and moved across the adjacent surface without adhering thereto by adhesive 204. Exemplary adjacent surfaces include, but are not limited to, another sheet, a desktop, or a wall. In this way, the retained sections, which are non-adhesive forms a part of a securing mechanism, allowing the sheet to exhibit adhesion on demand.

Figure 6:
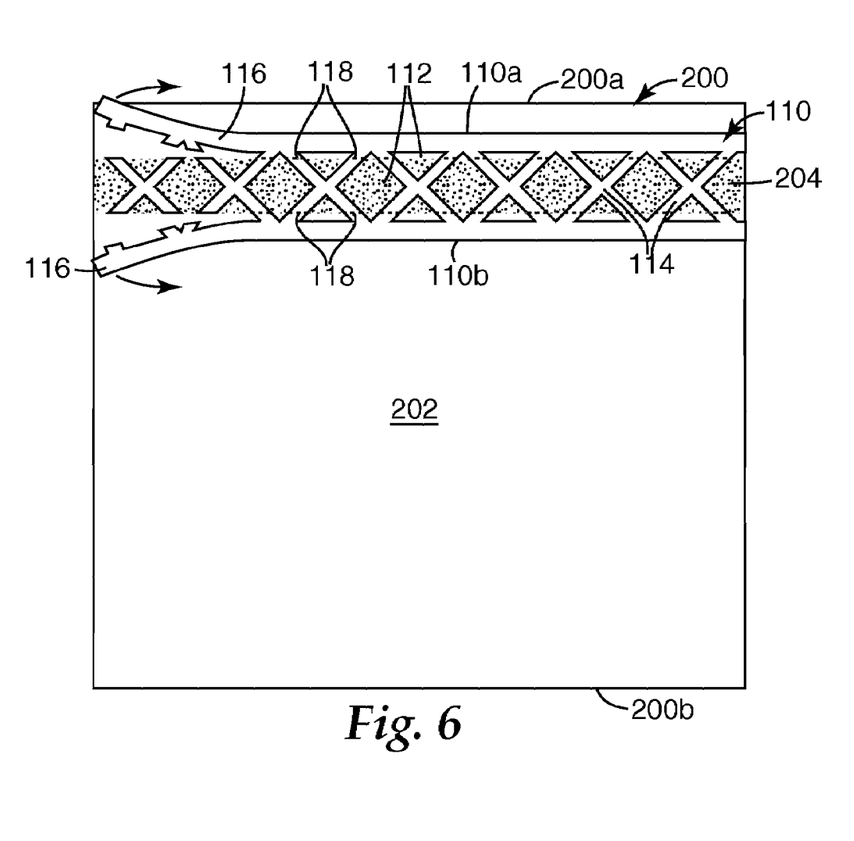
FIG. 6 is a bottom plan view of the embodiment of FIG. 4 showing carrier sections being removed.

FIG. 6 shows the embodiment of FIG. 4 where the upper and lower carrier sections are being removed at the perforation. Typically the carriers are discarded after they have been removed. In one method, after the perforated web 110 has been attached to the adhesive 204 of the substrate, such a composite is laminated together using pressure and or heat to adhere more securely the web 110 to the adhesive. Upon removal of the carrier, the retained sections, which now have been effectively laminated to the adhesive, will not lift off when the carrier section is being removed.

Figure 7:
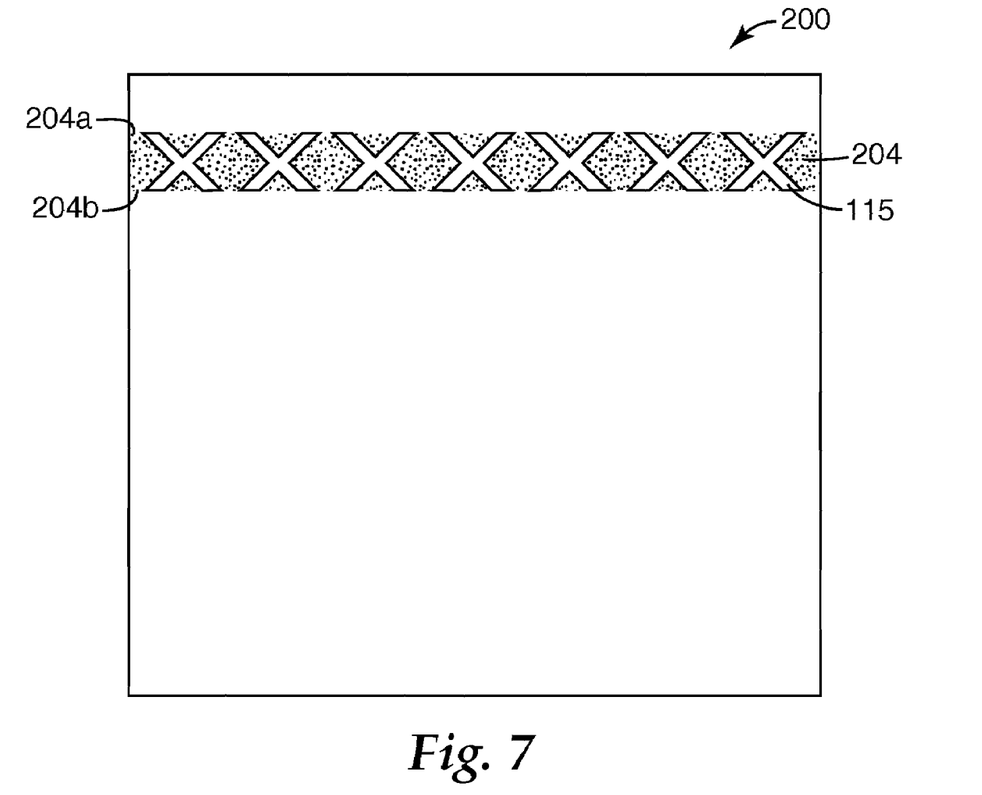
FIG. 7 is a bottom plan view of the embodiment of FIG. 6 after the carrier sections have been removed.

FIG. 7 shows the embodiment of FIG. 6 with both carrier sections removed leaving retained sections 115 (also referred to herein as "non-adhesive sections") with portions spanning substantially from the upper edge 204a to the lower edge 204b of the adhesive as well as substantially the entire length of the adhesive stripe. This figure shows that the retained sections are in the form of a plurality of discrete "X". Here, both legs of the "X" shaped retained section span from the top edge 204a of the adhesive to the bottom edge 204b of the adhesive. Furthermore, the retained sections span nearly the entire length of the adhesive portion. Other configurations can be used. For example, the retained sections can be in the form of geometric shapes that are substantially circles, squares, rectangles, other polygons, and combinations thereof. Furthermore, the line can be a continuous line a broken line, meaning that adhesive is exposed in between breaks in the line.

Figure 8:
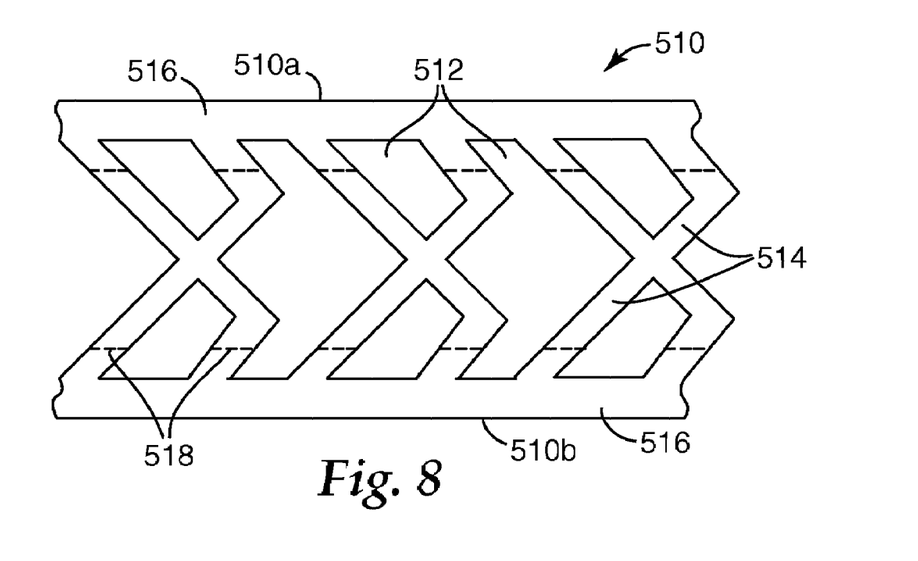
FIG. 8 is a top plan view of another exemplary patterned web that may be used according to one method of the present invention.

FIG. 8 shows another exemplary perforated web 510 having a plurality of open sections 512 interposed between a plurality of retained sections 514 connected to carrier sections 516. The perforated web includes an upper carrier section that includes a top edge 510a and a lower carrier section that includes a bottom edge 510b. This particular design of the perforated web 510 facilitates the carrier section removal step.

Figure 9:
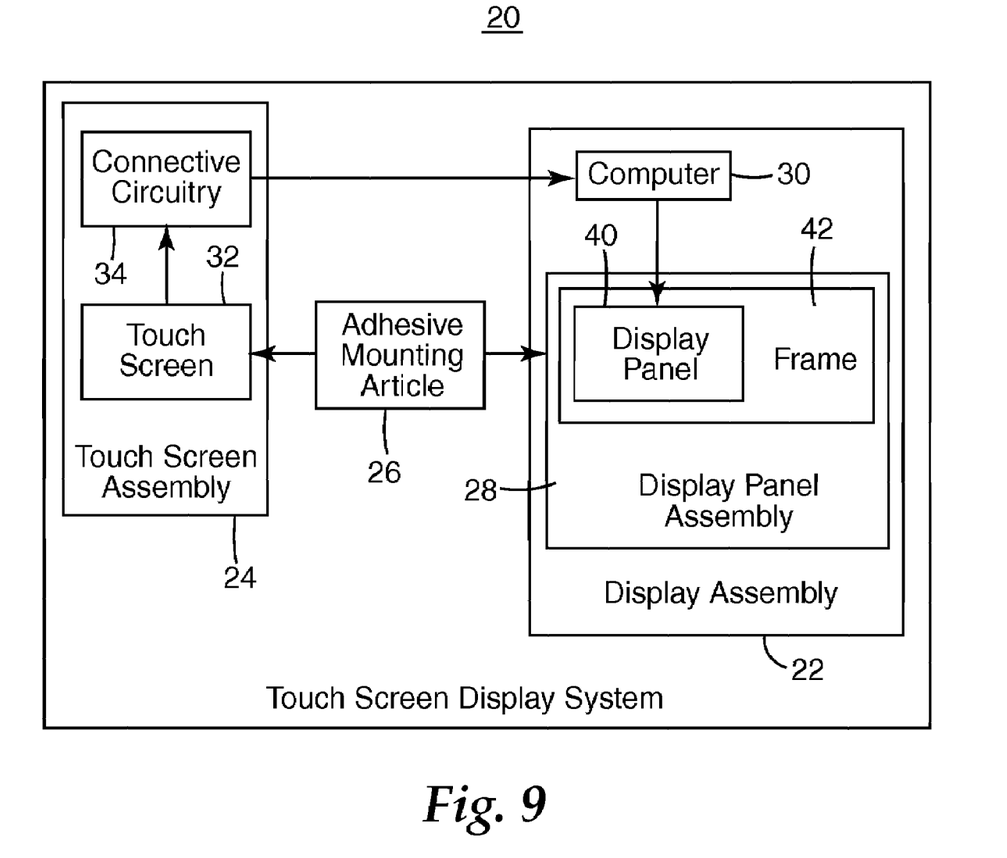
FIG. 9 is a perspective view of an exemplary easel pad of the present invention.

In one embodiment, a plurality of substrates such as that of FIG. 7 is assembled together to form a pad of substrates as shown in FIG. 9. Such a construction is typical of an easel pad 700, typically having 25 to 50 sheets of the substrate 720 stacked and bound together at one end 701, usually near the end of the adhesive region. The presence of the discrete sections disposed on the adhesive allows the sheets to be stacked without one sheet becoming substantially adhesively attached to the next subsequent sheet and thus the removal of a sheet can be done under substantially lower peel force. Furthermore, as a plurality of these sheets is used, e.g., for transcribing notes of a meeting, they are typically removed and displayed on a wall. At the end of the meeting, one participant usually collects the used sheets, stack them together, and optionally roll the sheets into a cylindrical tube for easy transport. The stacked sheets will typically not adhere to one another, unless a threshold force has been applied to the adhesive region. This adhesive on demand property provides the consumer with an added ease of use feature.

EXAMPLES

Example 1

A patterned and perforated web was made as follows.

A rotary die cutting apparatus available from Webtron Corp., Ft. Lauderdale, Fla., equipped with a vacuum trim removal system was used to make a 4.0 inch (10.2 cm) wide and a 0.002 inch (0.05 mm) thick general purpose polyethylene terephthalate available from Grafix Plastics, Cleveland, Ohio perforated web having the pattern shown in FIG. 2 having open sections and retained sections attached to a carrier. In this example, the excising of the web and the perforation of the web occurred using the same rotary die and done in one step.

The perforated web was contacted to an adhesive stripe of a sheet of Post-it® Self-stick Easel Pad, Product No. 559, commercially available from 3M Company, St. Paul, Minn. The perforated web was attached to the sheet of easel paper such that the perforations substantially nearly coincided with a top and a bottom edge of the adhesive stripe.

Thereafter, the carrier of the patterned and perforated web was manually separated, collected, and discarded leaving the discrete retained sections behind with the sheet of easel paper.

Example 2

A patterned and perforated web was made as in Example 1, except that the resulting web had a design substantially similar to web 310 shown in FIG. 4a.

The patterned and perforated web was laminated to a sheet of Post-it® Self-stick Easel Pad, Product No. 559 as in Example 1 and the carrier of the web was separated leaving discrete retained sections behind with the sheet of easel paper.

Although specific embodiments of the present invention have been shown and described, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. A method of adding discontinuities to an adhesive coated region of a substrate comprising the steps of:
   providing a web having upper and lower edges;
   excising portions of the web creating open sections interposed between retained sections connected to carrier sections, each including the upper or lower edge of the web to yield a patterned web;
   perforating the patterned web such that the perforations span from one open section to the next open section to yield a perforated web;
   contacting the perforated web to the adhesive coated region of the substrate; and
   removing the carrier sections at the perforations leaving the retained sections on the substrate.

2. The method of claim 1, wherein the retained sections are discrete.

3. The method of claim 1, wherein the perforations are disposed on a location of the perforated web selected from the group consisting of on the retained sections, between the retained sections and the carrier sections, and on the carrier sections.

4. The method of claim 1, wherein the adhesive region has an associated width and length and wherein the retained sections spans substantially nearly the entire width and or substantially nearly the entire length of the adhesive region.

5. The method of claim 1, wherein the excising step and the perforating step are combined in one step.

6. The method of claim 1, wherein the adhesive region has substantially parallel upper and lower edges, wherein in the contacting step, the perforation of the perforated web substantially coincides with at least one of the upper and lower edges of the adhesive region.

7. The method of claim 1, wherein the web is selected from the group consisting of paper and polymeric film.

8. The method of claim 7, wherein the polymeric film is selected from a group consisting of polyethylene terephthalate, polypropylene, polyethylene, and copolymers thereof.

9. The method of claim 1, wherein the adhesive of the substrate is a repositionable pressure sensitive adhesive.

10. The method of claim 9, wherein the repositionable pressure sensitive adhesive is polyacrylate based microsphere.

11. The method of claim 1, wherein after the contacting step and prior to the removing step, the method further comprises the step of applying pressure to at least one of the perforated web and substrate.

* * * * *